United States Patent Office 3,723,080
Patented Mar. 27, 1973

3,723,080
ION-EXCHANGE STRENGTHENED ELECTRICALLY-HEATED GLASS
Robert G. Howell, Corning, and Joseph N. Panzarino, Big Flats, N.Y., assignors to Corning Glass Works, Corning, N.Y.
No Drawing. Filed Feb. 12, 1971, Ser. No. 115,125
Int. Cl. C03c 17/00, 21/00
U.S. Cl. 65—30          5 Claims

ABSTRACT OF THE DISCLOSURE

Chemically strengthened, electrically-heatable glass for vehicle windows and the like, and a method of making it, comprising the steps of coating at least one surface of a soda aluminosilicate glass with an electroconductive paste to form a resistance heating grid, drying, firing the coated glass to a temperature sufficient to fuse the paste, and if desired, to sag the glass, and finally subjecting the fired glass to a source of exchangeable $K^+$ ions at a temperature below the strain point of the glass for a time sufficient to form a compressively stressed surface layer thereon.

BACKGROUND OF THE INVENTION

Electrical resistance heating has long been used as a means for preventing icing and fogging of vehicle and aircraft windows. Resistance heating systems for such windows generally comprise either conductive films or conductive grids, in contact with at least one surface of the glass to be heated, which are designed to provide maximum heating upon the application of a known voltage. Typically, conductive grids are applied to the glass by means of an electroconductive paste which is laid down as a series of narrow parallel resistance strips and a pair of wider bus bar strips intersecting and connecting with the narrow resistance strips and providing electrical contact therewith. The electroconductive paste may consist of a mixture of an organic vehicle component and a low-melting glass powder containing a finely-divided electrically conductive metal such as silver, and is fired onto the glass to form a permanent coating by heat treating the coated glass at elevated temperatures for a time sufficient to fuse the metal-glass frit to the glass.

Glass which is to be used for vehicle windows must meet certain safety requirements as to impact strength. To meet these requirements, the glass is customarily tempered by rapid quenching from an elevated temperature. This quenching provides a compressively-stressed skin over the surface of the glass which adds considerably to its impact strength. In the case of motor vehicle windows, this tempering step is usually combined with a sagging process wherein the glass is heated to a temperature above its softening point while being suspended in such a way as to sag into the shape desired for the windshield, and then rapidly quenched. If the window is to be electrically heated, an electroconductive frit may be applied prior to sagging and then fired on at the same time that the glass is sagged into the desired shape.

Although the foregoing procedure has been used to produce heating grids of good quality on tempered glass windows, particularly the rear windows of automobiles, it has been found that these grids, while effective to remove fog and minor frost accumulations, do not provide sufficient heat when powered by ordinary automotive voltages to remove significant snow and ice deposits in cold weather. This failure is largely attributable to the large mass of cold glass which must be heated above the ice point before noticeable clearing of the window occurs.

Recent developments in the fields of glass strengthening and thin flat glass technology have led to the developement of thin chemically-strengthened composite or laminated vehicle windows which offer adequate strength as well as a much greater degree of passenger safety in the event of a collision by comparison with thick, tempered, laminated auto glass. British Pat. No. 1,143,468, for example, discloses configurations for laminated safety windshields wherein the inner sheet consists of a chemically strengthened aluminosilicate glass between about .060–.090 inch thick, the outer sheet consists of an optionally strengthened glass between about .070–.120 inch thick, and the two sheets are bonded together by a transparent plastic interlayers, usually about .030 inch thick. Such a composite windshield may be made much thinner than a tempered glass laminated window, since glass thinner than about .120 inch has not been successfully tempered, at least on a routine production basis, to provide the strengths required for good impact resistance. The combined strength and light weight of chemically strengthened glass panels and laminates are properties which would permit the use of such glasses for thin vehicle windows which could be much more efficiently defrosted using an appropriate resistance heating grid, because of their lighter weight, than could thicker, tempered glass windows.

It is accordingly the principal object of the present, invention to provide chemically-strengthened soda alumino-silicate glass sheet with an integral conducting surface grid which is thin and light-weight, yet strong enough for high-strength sheet glass applications.

It is a further object of this invention to provide electrically-heatable, thin, chemically-strengthened glass sheets and laminates for use in the manufacture of safe vehicle or aircraft windows or the like offering improved de-icing efficiency.

Other objects of the invention will become apparent from the following detailed description thereof.

SUMMARY OF THE INVENTION

Briefly, our invention comprises ion-exchange strengthened soda aluminosilicate glass with an integral conducting surface coating and a method of making it. When the conducting coating is to be used as a heating element, the strengthened glass is generally in the form of a thin sheet or laminate, and the surface coating is in the form of a grid, so that the glass will be suitable for use as a heated vehicle or aircraft window or the like.

The method of making such glass comprises the initial step of coating at least a portion thereof with a electroconductive silver paste. Preferably, the paste is applied in the form of several narrow parallel resistance strips and a pair of wider bus bar strips intersecting the parallel resistance strips and providing electrical contact therewith. Other geometrical arrangements, such as series-parallel combinations with suitable bus bar configurations, may alternatively be employed. The electroconductive silver pastes, which normally contain metallic silver, a low-melting glass frit and organic binders, oils and solvents, should contain not more than about 70% by weight of silver. The coated glass is then fired at a temperature high enough to melt the glass frit, thus fusing the paste to the glass, and, optionally, high enough to sag the glass into any desired configuration. Finally, the coated glass is contacted with a source of exchangeable $K^+$ ions, usually in the form of a bath of molten potassium salt, at a temperature and for a time sufficient to provide a compressive surface layer thereon which is at least about 5 mils in depth.

Heated glass made by the described method can be manufactured thin enough, even in laminated form, to provide vehicle windows offering improved de-icing efficiency. In addition, such glass, even in thin (.105 inch or below) sheets, can demonstrate impact strengths sufficient to pass American Standard Safety Code specifications for motor vehicle side windows, provided ion-exchange treatments which can produce compressive stresses of at least about 35 kg./mm.² in the strengthened glass are employed.

DESCRIPTION OF THE PREFERRED EMBODIMENTS

Soda aluminosilicate glasses suitable for the purposes of coating and strengthening according to the present invention are those, for example, of the type described in British Pat. No. 966,733. Such glasses consist essentially of about 5–25% by weight of $Na_2O$ and about 5–25% by weight of $Al_2O_3$, with the balance of the glass being silica. Optionally, up to about 15% by weight of other compatible glass-forming ingredients may be present. Glasses in which either the $Na_2O$ or $Al_2O_3$ content is above about 25% by weight are generally low in chemical durability and/or two difficult to melt to be of practical interest.

Glasses of the type just described are preferred for the purposes of the present invention because they exhibit sufficient abraded strength after chemical strengthening to be particularly suitable for windshields and the like. However, as either the $Na_2O$ or $Al_2O_3$ content is decreased, the degree of strengthening within a given time diminishes, and it is accordingly preferred that their combined content be not less than about 15% by weight of substantial abraded strength is to be imparted.

Although the above-described soda aluminosilicate glasses exhibit very high impact strengths after chemical strengthening, we have found that the subsequent application of conductive silver pastes to the strengthened glass according to ordinary methods produces unacceptable losses in the chemically-imparted impact strength thereof. Minor strength losses are also observed after application of silver pastes to annealed glasses, and are attributable to minute flaws introduced into the surface of the glass by the pastes during firing. However, such flaws assume major importance if the glass is chemically strengthened, since the compression layer giving rise to the strength is ordinarily quite thin and since penetration by a flaw into the compression layer markedly decreases the strength of the article at the point of penetration. Furthermore, the firing step required to mature the silver paste can cause stress release in the compressive surface layer of the glass, causing still further reductions in strength. Accordingly, we have found that the application of the silver paste prior to the chemical strengthening step, rather than subsequent thereto, is very important in obtaining acceptable impact strength in the finished product.

In view of this requirement that the glass be ion-exchange strengthened subsequent to the application and firing of the silver plate, we have found that the silver content of the paste must be maintained within specific limits if its effect on the ion-exchange strengthening process is to be minimized. The ordinary effect of the paste is to block ion-exchange in the area covered thereby, and thus to prevent the formation of a surface compression layer of sufficient depth and magnitude to provide reasonable impact strength in the very area where the introduction of surface flaws by the paste during firing makes strength mandatory. In particular, we have found that if the silver content of the paste exceeds about 70% by weight, then ion-exchange blockage by the paste becomes excessive and useful improvements in glass strength may not be obtained through the use of conventional ion-exchange strengthening treatments. Table I illustrates the critical effect of paste silver content on ion-exchange blockage during chemical strengthening. Sodium aluminosilicate glass samples were coated on one side with pastes differing only in silver content, dried, fired to about 725° C., and ion-exchange strengthened for 10 hours at 480° C. in a molten $K^+$ ion salt bath. Stress profiles of the samples were then read using a Babinet polarimeter. The low displacement of the neutral fringe line observed on the coated side of some samples is indicative of low surface compression, the result of ion-exchange blockage. The greater the difference in neutral fringe displacement between the coated and uncoated side, the more efficient the ion-exchange blockage, and the less desirable the paste.

TABLE I

| Approximate wt., percent Ag in paste | Fringe displacement, cm. | | Difference in displacement, cm. |
|---|---|---|---|
| | Coated | Uncoated | |
| 85 | 0.0 | 3.0 | 3.0 |
| 77 | 0.5 | 2.5 | 2.0 |
| 70 | 2.2 | 2.5 | 0.3 |
| 60 | 2.1 | 2.4 | 0.3 |

From a review of data of this type, we have determined that ion-exchange blockage rapidly increases as paste silver content exceeds about 70% by weight, probably as the result of the disappearance of discontinuities in the fired coating. Hence, pastes containing less than about 70% silver by weight should be employed if conventional ion-exchange strengthening treatments are to be effective.

Whereas the effectiveness of the strengthening process requires a paste containing not more than about 70% by weight of silver in order to minimize ion-exchange blockage, the heating efficiency of the resistance element or grid requires a certain minimum silver content in the paste to achieve coatings within an appropriate resistance range. Generally, the lower the silver content of the paste, the higher the resistance of the resulting coating, and if the resistance of the coating is too high, insufficient current will flow across the coating to heat the glass to the point where efficient deicing will occur. For example, we have found that film resistances between about .003 and .006 ohm per square are preferred for heating elements to be powered by 12 volts of direct current, the ordinary automobile battery voltage. Of course, film resistance can be varied by controlling the film thickness, with thicker films being lower in resistance than thinner films, but this method of control is of limited value since thicker films are less durable in service and also increase ion-exchange blockage during chemical strengthening, thus compromising the strength of the finished glass. As a practical matter, films no greater than about .001 of an inch in thickness will be employed, with thicknesses on the order of about .0002–.0005 inch being preferred.

Table II illustrates the effect of paste silver content and film thickness on coating resistivity and ion-exchange blockage. The silver pastes were again applied only to one side of a glass sample and fired on at about 725° C., after which the glass was ion-exchange strengthened for 12 hours at 535° C. in a $K^+$ ion molten salt bath. Although all of the samples shown are considered within the useful range of resistivity for heating grid applications, it can be seen that the higher resistivity coatings would have to be applied in near maximum thicknesses (about 1 mil) to be within the preferred range of resistance.

TABLE II

| Sample Number | Approximate paste Ag content percent by weight | Coating thickness 1×10⁻⁴ inches | Coating resistivity, ohms/square | Fringe displacement, cm. | | Difference in displacement, cm. |
|---|---|---|---|---|---|---|
| | | | | Coated | Uncoated | |
| 1 | 70 | 3 | .006 | 2.4 | 2.7 | 0.3 |
| 2 | 70 | 2 | .012 | 2.6 | 2.7 | 0.1 |
| 3 | 65 | 3 | .006 | 2.4 | 2.7 | 0.3 |
| 4 | 65 | 2 | .015 | 2.6 | 2.7 | 0.1 |
| 5 | 60 | 4 | .014 | 2.7 | 2.7 | 0.0 |
| 6 | 60 | 2 | .033 | 2.7 | 2.7 | 0.0 |
| 7 | 60 | 3 | .015 | 2.7 | 2.8 | 0.1 |
| 8 | 60 | 2 | .036 | 2.7 | 2.8 | 0.1 |

From the above data it can be seen that only compositions containing a comparatively narrow range of silver concentrations can provide both acceptable resistivity values and minimal ion-exchange blockage. We have found that silver contents ranging between about 60–70% by weight of the paste are suitable for heating grid applications, with pastes containing about 68–70% silver by weight being preferred for the production of the thinner, more durable coatings. The remainder of the paste is normally made up of about 4–7% of a fritted low-melting glass and a vehicle component consisting of organic binders and solvents. The concentrations of the components other than metallic silver and fritted glass are not critical in obtaining the objects of the invention and may be adjusted to suit the demands of the particular paste application and firing procedures employed. For example, we have found that good results may be obtained using a paste consisting essentially of about 69% silver metal, 7.0% of a lead borosilicate glass frit and 24% organic binders, oils and solvents. Such a paste may be first dried, at elevated temperatures up to about 120° C. if desired, and then fired at temperatures between about 590°–725° C. for a time sufficient to completely melt the glass frit. This time will usually not exceed about 8 minutes even at the lower temperatures, since the fritted glass normally softens at temperatures below about 590° C. Firing temperatures at the upper end of the range are used only when the glass is to be sagged concurrently with firing, in which case the sagging time may range up to about 10 minutes. Of course, longer times and higher temperatures may be used for firing if desired, but they are of no particular benefit and are considered economically impractical. The organic components of the paste decompose and volatilize during firing, leaving only silver and fused glass behind.

The attainment of the degree of glass strengthening required to meet American Standard Safety Code specifications as to impact strength require not only an appropriate choice of a silver paste, but also careful control over the chemical ion-exchange schedule employed. For example, Code specifications require that ion-exchange strengthened glass to be used for automobile backlites be of sufficient strength than ten or twelve 12″ x 12″ samples survive the impact of a one-half pound steel ball dropped from a height of ten feet, and hat four of five similar samples survive the impact of an eleven-pound shot bag dropped from a height of eight feet. As previously explained, the application of a silver paste and subsequent firing of that paste introduces flaws into the surface of the coated glass which can weaken it substantially. In the case of tempered glass, were surface compression layers produced by tempering are at least about 30 mils and usually about 40 mils thick, and where the glass itself is normally at least about .185 inch thick, these surface flaws are not of sufficient magnitude to result in the failure of the glass to meet the prescribed specifications. In the case of thin chemically-strengthened glass, however, the surface compression layer is ordinarily much shallower, being on the order of 7–8 mils in thickness. Such layers are in the range where sudden shocks of the type encountered in impact strength testing can cause propagation of surface flaws into the tension zone below the compression layer, causing immediate catastrophic failure of the glass sample. Accordingly, we have found that the attainment of the degree of strength required in thin, chemically-strengthened glass containing surface flaws introduced during the coating process require the achievement of a certain minimum level of surface compression and depth of compression layer during strengthening.

The surface compression required of a thin sheet to meet minimum strength requirements is significantly greater than that required in a thicker sheet, and as previously explained, thin sheets are preferred for the purposes of the present invention from the standpoints of both safety and heating efficiency. Thus, we prefer to employ sodium aluminosilicate glass sheets not exceeding about .105 inch in thickness for the purpose of fabricating heated automobile backlites, with sheets as thin as about .085 inch also being advantageously employed. To attain the required impact strengths in such sheets, we have found that surface compressions of at least about 35 and preferably about 39 kilograms per square millimeter are required. For thinner sheets, for example, of about .085 inch in thickness, surface compressions should be even higher, at least about 45 and preferably about 47 kilograms per square millimeter. Such surface compressions may best be obtained by ion-exchange treatments wherein the glass is immersed in a molten $K^+$-containing salt at temperatures ranging from about 500°–535° C. for periods of time ranging between about 6–12 hours. Lower temperature treatments are preferred for thin sheets to obtain the requisite high surface compressions, but treatments of less than about 6 hours duration are not recommended in view of the difficulty of obtaining the required depth of compression layer (at least about 5 mils) therewith. The upper time-temperature limits are necessary to avoid the loss of surface compression due to stress release which occurs at an increased rate as treatment temperature increases.

Table III contains data correlating ion-exchange schedule with surface compression and resulting impact strength for several strengthened sodium aluminosilicate glass samples. The glass samples were 12″ x 12″ squares, of a composition consisting essentially, in weight percent, of about 61% $SiO_2$, 17% $Al_2O_3$, 13% $Na_2O$, 3.4% $K_2O$, 4.0% MgO, 0.8% $As_2O_3$, and 0.8% $TiO_2$. A silver paste containing approximately 70% silver and 7% of a lead borosilicate glassfrit, with the remainder being organic binders and solvents, was applied to the glass to form a conducting network consisting of 8 parallel lines, 0.030 inch wide, 11 inches long, and 1⅛ inches apart. The paste was applied by silk screening, using 306 mesh and 196 mesh screens to produce coatings approximately .0003 and .0005 inch in thickness respectively, and then the coated samples were oven-dried at 110° C. for 15 minutes. After drying, the samples were fired at temperatures in excess of 590° C., and up to about 725° C. in cases where a sagging schedule was used, for a time sufficient to fuse the paste. Following firing, the ion-exchange samples were strengthened by immersion as shown in a molten salt bath consisting of 92% $KNO_3$ and 8% $K_2SO_4$.

TABLE III

| Glass thickness, inches | Coating thickness, inches | Maximum firing temperature, °C. | Ion-exchange schedule °C. | Hours | Surface compression kg./mm.² | Coating resistivity, ohms/sq. | Impact strength test | Breaking height (feet) Max. | Min. | Average |
|---|---|---|---|---|---|---|---|---|---|---|
| .1016 | .0005 | 725 | 525 | 16 | 34.4 | 3.2 | ½ lb. ball | 13 | 6 | 9.3 |
| .1017 | .0005 | 725 | 525 | 12 | 39.0 | 3.8 | do | 18 | 10 | 15.5 |
| .1025 | .0005 | 725 | 525 | 10 | 40.6 | 3.8 | do | 23 | 7 | 15.5 |
| .1029 | .0003 | 725 | 525 | 10 | 40.5 | 5.1 | do | 22 | 14 | 18.8 |
| .1032 | .0003 | 590 | 525 | 10 | 39.0 | 6.0 | do | 23 | 12 | 18.5 |
| .1028 | .0003 | 590 | 525 | 10 | 40.0 | 4.8 | 11 lb. shot bag | All survived 9 feet | | |
| .0869 | .0003 | 590 | 525 | 6 | 41.0 | 4.1 | ½ lb. ball | 11 | 5 | 7.2 |
| .0870 | .0003 | 590 | 505 | 7 | 47.0 | 5.7 | do | 23 | 10 | 18.8 |
| .0865 | .0003 | 590 | 505 | 7 | 47.0 | 5.7 | 11 lb. shot bag | All survived 9 feet | | |

Coating resistivities did not change during ion-exchange strengthening and all were within a range suitable for 12 volt heating grids. In a modification of the ball drop test wherein the ball was constrained to drop directly on one of the silver grid lines, breaking heights although still good, were somewhat less than those shown in Table III, presumably because of the flaws introduced into the glass surface at the grid lines during the firing on of the silver paste.

The durability of conductive grids applied according to the above procedure was tested by subjecting coated samples to artificial weathering conditions. The grid resistance values were first checked and the samples then placed in a weathering device wherein the environment was cycled as follows: 102 minutes of high intensity ultraviolet radiation with a maximum temperature of 66° C. and a relative humidity of 67%, and then 18 minutes of water spray in addition to the ultraviolet radiation, resulting in temperatures ranging from about 27°–38° C. and a relative humidity of 100%. Samples were cycled in this way for a period of 1000 hours with periodic inspections made of resistance and adherence characteristics. At the end of 1000 hours, no resistance changes were evident in any of the grids and the silver coatings could not be removed by the application and subsequent rapid removal of adhesive tapes. Further durability tests conducted in boiling water for times up to 12 hours produced the same positive results.

Of course the applicability of the method of the invention is not limited to the production of heated vehicle windows but also to the manufacture, for example, of chemically-strengthened glass with integral conducting coatings for burglar-alarmed, strengthened windows, heated glass trays, or any other applications where strength and light weight in a conductive grid substrate would be advantageous.

We claim:
1. A method of manufacturing an ion-exchange strengthened soda aluminosilicate glass article having an electrically-conductive surface coating on at least a portion thereof comprising the steps of coating at least a portion of said glass article with an electroconductive silver paste, said paste containing not more than about 70% by weight of metallic silver and about 4% by to 7% weight of a low-melting fritted glass, firing the coated glass article at a temperature sufficient to fuse the paste to the article, and subjecting the coated article to a source of exchangeable $K^+$ ions at a temperature and for a time sufficient to produce a compressively-stressed surface layer thereon.

2. A method according to claim 1 wherein the electroconductive silver paste consists essentially, in weight percent, of about 60–70% metallic silver and 4–7% of said low-melting fritted glass, with the remainder being made up of organic binders, oils and solvents.

3. A method according to claim 2 wherein the temperature sufficient to fuse the paste to the glass article ranges between about 590°–725° C.

4. A method according to claim 3 wherein the source of exchangeable $K^+$ ions is a bath of a molten potassium salt.

5. A method according to claim 4 wherein the coated glass article is subjected to the source of exchangeable $K^+$ ions for a time ranging between about 6–12 hours, at a temperature ranging between about 500°–535° C.

References Cited
UNITED STATES PATENTS

| | | | |
|---|---|---|---|
| 3,154,503 | 10/1964 | Janakirama-Rao et al. | 65—30 |

FOREIGN PATENTS

| | | | |
|---|---|---|---|
| 1,194,090 | 6/1970 | England | 65—60 |
| 1,010,164 | 11/1965 | England | 65—30 |

S. LEON BASHORE, Primary Examiner

K. M. SCHOR, Assistant Examiner

U.S. Cl. X.R.
65—60; 117—124 C